United States Patent
Huntington (10) Patent No.: US 7,323,395 B2
(45) Date of Patent: Jan. 29, 2008

(54) MANUFACTURE OF SOLID STATE ELECTRONIC COMPONENTS

(75) Inventor: David Huntington, Bovey Tracey (GB)

(73) Assignee: AVX Limited (GB)

( * ) Notice: Subject to any disclaimer, the term of this patent is extended or adjusted under 35 U.S.C. 154(b) by 415 days.

(21) Appl. No.: 10/478,839

(22) PCT Filed: May 24, 2002

(86) PCT No.: PCT/GB02/02466

§ 371 (c)(1), (2), (4) Date: Aug. 31, 2004

(87) PCT Pub. No.: WO02/097832

PCT Pub. Date: Dec. 5, 2002

(65) Prior Publication Data

US 2005/0000071 A1   Jan. 6, 2005

(30) Foreign Application Priority Data

May 24, 2001 (GB) ................................. 0112674.7

(51) Int. Cl.
*H01L 21/46* (2006.01)
*H01L 21/30* (2006.01)
*H01L 21/20* (2006.01)
*H01L 21/762* (2006.01)
*H01G 4/38* (2006.01)

(52) U.S. Cl. ...................... 438/455; 438/396; 438/458; 257/E21.567; 361/328

(58) Field of Classification Search ................ 438/396, 438/399, 455, 456, 458; 257/E21.567; 361/328
See application file for complete search history.

(56) References Cited

U.S. PATENT DOCUMENTS 4,612,083 A * 9/1986 Yasumoto et al. ............ 438/59
5,357,399 A    10/1994 Salisbury
5,824,571 A * 10/1998 Rollender et al. .......... 438/130
6,097,096 A * 8/2000 Gardner et al. ............. 257/777

FOREIGN PATENT DOCUMENTS

| WO | WO9850929 A1 | 11/1998 |
| WO | WO0028559 A1 | 5/2000 |
| WO | WO0111638 A1 | 2/2001 |
| WO | WO0122451 A1 | 3/2001 |

* cited by examiner

*Primary Examiner*—Luan Thai
(74) *Attorney, Agent, or Firm*—Dority & Manning, P.A.

(57) ABSTRACT

The present invention concerns methodologies for the mass production of solid state components, in particular capacitors, although other component types including, but not limited to, diodes and resistors may be produced. According to one aspect of the method of manufacturing first and second substrates are provided with a plurality of first and second solid state electronic component elements formed on a surface of each substrate. The first and second substrates are aligned so that respective first and second component elements are each mutually aligned, and the first and second substrates are fixed together, so that the first and second elements are operatively connected one to another, thereby forming a substrate sandwich. The substrate sandwich may be divided to form a plurality of individual components, each comprising a first component element cooperatively connected to a second component element.

11 Claims, 9 Drawing Sheets

MANUFACTURE OF SOLID STATE ELECTRONIC COMPONENTS

The present invention concerns the field of the manufacture of solid state components, and in preferred embodiments, capacitors. The method relates particularly to massed production methods for manufacturing solid state components such as capacitors.

A massed production method for solid state tantalum capacitors is described in U.S. Pat. No. 5,357,399 (inventor Ian Salisbury). This method involves providing a substrate wafer of solid tantalum, forming a sintered, highly porous, layer of tantalum on the substrate, sawing the layer of porous tantalum with an orthogonal pattern of channels to produce an array of upstanding porous tantalum rectilinear bodies, anodising the cubes to produce a dielectric layer on the bodies, dipping the bodies in manganese nitrate solution and heating to convert the applied solution to manganese dioxide thereby to form a cathode layer, applying respective conducting layers of carbon and then silver onto top ends of each body, bonding a lid consisting of a wafer of solid metal onto the silver layer; injecting insulating resin material into the channels between bodies constrained by the substrate and lid; and slicing the assembly in a direction perpendicular to the plane of the wafers and along the centre line of each channel thereby to produce a plurality of capacitors in which the anode terminal consists of substrate material, the cathode terminal consists of lid material and the capacitive body consists of the coated porous tantalum body.

With miniaturisation of electronic goods, particularly mobile telephones, but also many other goods, there is continued pressure to improve the volumetric efficiency of electronic components, and in particular solid state capacitors. The above Salisbury method provides a highly effective method for the manufacture of plural solid state capacitors.

PCT/GB99/03566 discloses a method of increasing volumetric efficiency in solid state capacitors manufactured generally according to the Salisbury method. The process improvement involves omission of a lid layer and forming a cathode terminal directly on an exposed surface of the anode body of each capacitor.

PCT/GB00/01263 discloses a method of forming multiple capacitors, each of which has pole contacts on a common face, thereby permitting the capacitor to be placed overlaying respective printed circuit board (PCB) contacts, reducing the footprint of the component on a PCB.

It is an object of the present invention to provide an improved method of manufacturing solid state electronic components, particularly a method which permits the production of components having a reduced foot print. The preferred method relates to the production of capacitors having reduced footprint.

According to one aspect of the present invention there is provided a method of manufacturing multiple solid state electronic components comprising:

(i) providing a first substrate provided with a plurality of first solid state electronic component elements formed on a surface thereof, (ii) providing a second substrate provided with a plurality of second solid state electronic component elements formed on a surface thereof, (iii) aligning the first and second substrates so that respective first and second component elements are each mutually aligned, (iv) fixing the first and second substrates together, so that the first and second elements are operatively connected one to another, thereby to form a substrate sandwich, (v) dividing the substrate sandwich to form a plurality of individual components, each comprising a first component element operatively connected to a second component element.

Suitable types of component are capacitors, diodes and resistors, although this list is not exhaustive and other suitable components are available to be made using this method.

The first component elements and the second component elements may have the same electronic function. For example, the component elements may each be capacitors, or may each be resistors. In certain embodiments, the respective elements may have differing performance characteristics as between first elements on the one hand and second on the other. So, for example, capacitors having differing capacitances may be incorporated in a the final component.

Alternatively, and according to another aspect of the invention, the first and second component elements respectively have different electronic functions. In this way, for example a component may be formed comprising a capacitor connected to a resistor.

This foregoing general method allows the production of dual element components, for example capacitor pairs, in a single component. Integrating a pair of electronic elements into a single component reduces the footprint as compared to two individual components, and reduces the number of solder steps required to incorporate the capacitors into an electrical circuit, typically on a PCB. Another important advantage is that in since one component is taking the place of two, the assembly time and number of assembly steps for a PCB are reduced.

According to a preferred aspect of the present invention, there is provided a method of manufacturing multiple solid state capacitive components comprising:

a) providing a first substrate layer;
b) forming on one surface of the first substrate layer a plurality of first upstanding bodies consisting of porous sintered valve-action material;
c) providing a second substrate layer;
d) forming on one surface of the second substrate layer a plurality of second upstanding bodies consisting of porous sintered valve-action material;
e) forming an insulating layer on and extending through the porosity of the first and second bodies;
f) forming a conducting cathode layer on the insulating layer;
g) aligning the first and second substrates so that the bodies are mutually aligned;
h) fixing the first and second substrates together to form a substrate sandwich in which first and second bodies are operatively connected;
i) encapsulating the porous bodies in electrically insulating material and
j) dividing the substrate sandwich into a plurality of individual capacitive components, each comprising two capacitors, the first corresponding to the first porous body and the second corresponding to the second porous body.

According to a particular embodiment of the invention, at step g) the substrates may be aligned face to face so that their respective first and second upstanding bodies face each other and step h) comprises electrically connecting aligned free ends of the upstanding bodies to form a sandwich configuration in which the first and second substrate layers are outer layers, whereby on division of the substrate sandwich, there is formed a plurality of component pairs, each having first and second anodic terminals corresponding to the outer first and second substrates, and a cathodic region corresponding to the electrical connection between the free ends of the bodies.

At step g) a plate of conducting material may be interposed between the respective free ends of the first and second bodies so that the electrical connection is made via the plate material. Thus dividing at step h) also divides the plate material, and an exposed surface portion of the plate material formed in each component by the dividing provides a cathode terminal for each component. By providing a plate material terminal site, it is possible to configure the devices as a parallel pair in which the cathode terminal provides a negative electrical contact and the two anode terminals are electrically connected to provide a positive electrical contact site. The connection of both anode terminals is typically by a printed circuit lines on a circuit board terminal. It is also possible to provide an array pair in which the anode terminals provide two distinct positive contact sites and the cathode terminal provides a negative contact site. It is also possible to provide a series pair, by connection of the respective anode terminals in a circuit, without connecting the cathode terminal.

According to yet another embodiment of the invention, step g) is made by means of discrete conducting adhesive pads applied between the free ends of the first and second upstanding bodies. Thus the encapsulation process at step h) may also encapsulate the electrical connection region, thereby obscuring the cathodic region in each component and permitting the formation of a component without a cathodic terminal. The above embodiment is suitable for producing series pair capacitor components. In these components a negative terminal is not required. Hence the plate used to form a cathode terminal in the first embodiment above may be omitted. Conveniently a conducting adhesive paste or the like is used to electrically connect upstanding body free ends. The connection region is encapsulated to prevent accidental contact with the cathode terminal. This embodiment is simpler to manufacture, but clearly lacks the versatility of the components made according to the first embodiment.

According to a further embodiment of the invention, at step g) the substrates may be aligned back to back so that their respective first and second upstanding bodies face away from each other and step h) comprises electrically connecting back faces of the substrates together to form a sandwich configuration in which the first and second substrate layers are inner layers, and the porous bodies are outer layers, whereby on division of the substrate sandwich, there is formed a plurality of component pairs, each having an anodic terminal region corresponding to the inner first and second connected substrates, and first and second cathodic terminal regions corresponding to respective first and second end regions of the component.

In preferred embodiments the valve-action material for use in forming a capacitor is a metal, and in particular tantalum. However other valve-action materials and metals may be used in the process of the present invention. Examples are niobium, molybdenum, silicon, aluminium, titanium, tungsten, zirconium and alloys thereof.

When the valve action metal is tantalum the substrate is preferably a solid tantalum wafer, thereby ensuring physical and chemical compatibility with the porous metal.

The porous bodies may be formed by a powder metallurgy route. Typically a seeding layer of coarse grade powder may have to be applied to the substrate and sintered thereto before a finer grade green powder/binder mixture is pressed onto the substrate. The coarse grade powder provides mechanical keying ensuring that a strong connection between the sintered porous bodies and the substrate is produced. The strong connection is necessary to ensure that separation of the porous bodies from the substrate does not occur during subsequent steps in the manufacturing process. A uniform layer of green powder/binder mixture can be applied to the substrate, fixed by sintering, and then machined to form the desired array of bodies on the substrate. An alternative method of forming the bodies is described in PCT application GB00/03058, in which a die/pressing process is used to produce a green array of bodies on the substrate, which array is sintered to form the final porous bodies.

The dielectric layer may be formed by an electrolytic anodization process in which an oxide film is carefully built up on the surface of the porous sintered anode body. Suitable methods will be known to the person skilled in the art.

The cathode layer may be formed by dipping the upstanding bodies into a cathode layer precursor solution such as manganese nitrate and then heating to produce a cathode layer of manganese dioxide. Repeated dipping and heating steps may be carried out in order gradually to build up the required depth and integrity of cathode layer.

Typically, during the dipping process the cathode layer will be built up not only on the anode bodies, but also on the exposed tantalum substrate surface between bodies. In order that each cathode terminal is isolated from its respective anode terminal a further process step may be carried out to remove any cathode layer (and dielectric layer) from the substrate around the anode body. This process may involve a further machining process in which isolating channels are formed between each anode body by removal of a surface layer of substrate. For example, where orthogonal rows have been machined to form rectilinear anode bodies, isolating channels may be machined along the centre lines of the rows and columns between anode bodies. In this way, a step is formed in the perimeter of each capacitor anode body, which step has an un-coated surface, thereby isolating the cathode layer from the exposed anode terminal. A reformation process may then be carried out in which the newly exposed surface is formed with an insulating oxide layer. An alternative isolation process is described in PCT application GB00/03558, in which machining is replaced by the use of resist layers to prevent unwanted contamination.

The encapsulation process may be carried out by infiltrating a liquid resin into the space between upstanding bodies. In one preferred embodiment the space is filled with an insulating plastics resin material, such as epoxy resin. In this way when the substrate is divided each capacitor body may be left with a protective resin sleeve about the porous body portions thereof. The encapsulating resin may be applied under pressure or by simple immersion depending upon the suitability and fluidity of the particular resin. Once the resin has set, the resin and substrate may be machined or otherwise cut to separate adjacent capacitor bodies. The encapsulation material may be a plastics resin, such as epoxy.

Where it is desired to have a cathode terminal, the terminal may be formed by applying one or more conducting layers to the band of exposed plate provided on each component by the dividing process. Suitable solder compatible metal layer coatings may be applied as required to facilitate soldering at the terminal.

The dividing of the substrate sandwich is typically carried out by machining perpendicular to the plane of the substrates, along the "streets" between adjacent body portions, and thus through the encapsulation material.

According to a further aspect of the invention there is provided a capacitor produced by any method hereinbefore described.

According to another aspect of the invention there is provided an electronic or electrical device comprising a capacitor made by any method hereinbefore described.

Following is a description by way of example only and with reference to the drawings of one method of putting the present invention into effect.

Figure 1:
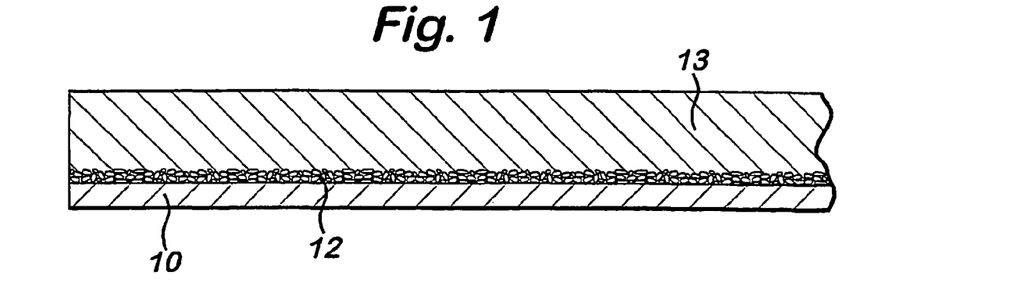
FIGS. 1, 3 and 4 are cross-sectional views of a substrate during processing according to a process of the present invention.

A transverse section through a solid tantalum circular wafer is shown as 10 in FIG. 1 (other shapes are possible such as square, rectangular etc.). An upper surface of the wafer has sintered thereon a dispersion of coarse grained capacitor grade tantalum powder 12. A green (i.e. unsintered) mixture of fine-grained capacitor grade tantalum powder/binder is then pressed onto the upper surface of the substrate to form a green layer 13.

The green layer is sintered to fuse the fine grained powder into an integral porous network. The sintering is carried out at around 1600 degrees centigrade (the optimum temperature will depend upon the grain size and the duration of the sintering process). The sintering process also fuses the porous layer to the coarse seeding layer 12.

Figure 2:
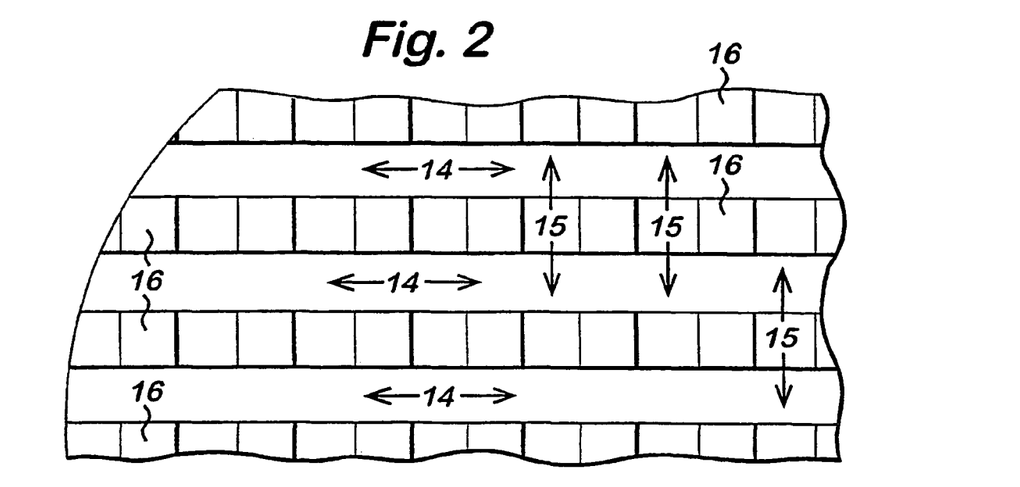
FIG. 2 is a view from above of the substrate after a machining step in the process.
Figure 3:
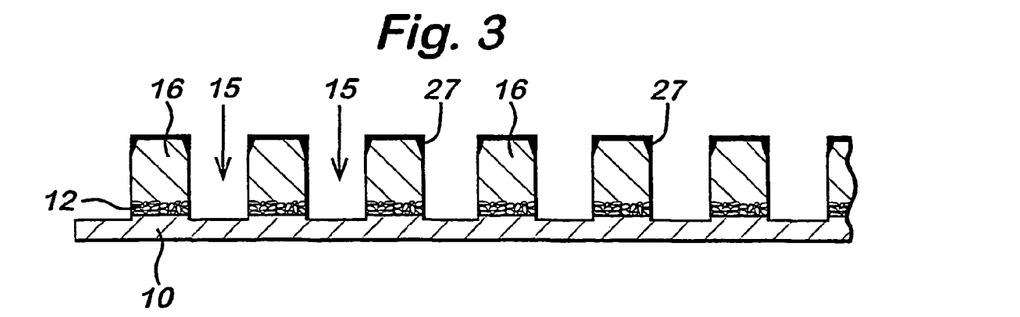

The substrate assembly is then machined to produce an orthogonal grid of transverse channels 14 and longitudinal channels 15 as shown in FIG. 2. The channels are ground using a moving rotating cutting wheel. The channels are cut to a depth just beyond the level of the porous tantalum layer so that the cuts impinge on the substrate, as shown in FIG. 3.

The machining process produces an array of orthogonal section bodies 16 on the substrate. The porous bodies form the anode portions of the capacitors. An insulating dielectric layer (not shown) is applied to the anode bodies by anodizing in an electrolyte bath (of e.g 0.1% phosphoric acid solution) while connecting the positive terminal of a D.C. power supply to the substrate. This results in the formation of a thin tantalum pentoxide layer on the metal porous surface of the bodies and exposed substrate.

A cathode layer (not shown) is then formed on the anode bodies by the well known manganization process. In this process the anodized anode bodies 16 are immersed in manganese nitrate solution to leave a coating of wet solution on each body and covering its internal porosity. The substrate is heated in moist air to convert the coating of nitrate to the dioxide. The immersion and heating cycles may be repeated as many as 20 times or more in order to build up the required coherent cathode layer.

Next, the manganized bodies are coated with an intermediate layer (not shown) of conducting carbon by dipping into a bath of liquid carbon paste. The carbon paste is allowed to set. After the carbon layer has set, a further intermediate layer 27 (FIG. 3) of silver is coated onto the carbon layer by dipping of the carbon-coated bodies into a liquid silver paste. The silver layer is not allowed to pass beyond the carbon layer underneath in order to ensure that silver does not directly contact the incompatible oxide underlayer.

Figure 4:
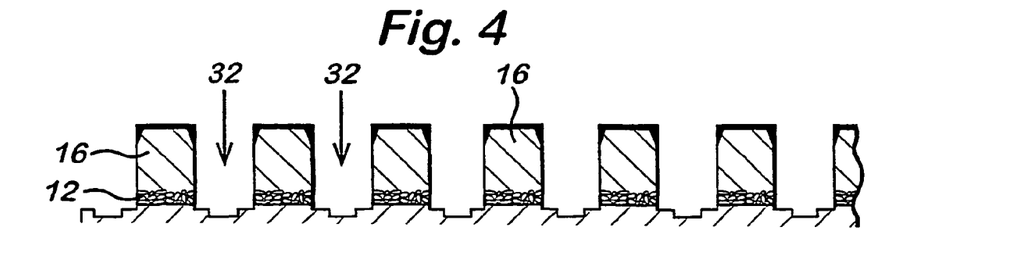

In the above process stray portions of manganizing layer, carbon paste or silver paste may contaminate surface portions of the substrate channels 15,14. These conducting portions could cause a short circuit between the anode and cathode in the final capacitors, so must be removed. In order to do this, a further machining step is carried out in which an orthogonal pattern of channels 32 is sawn into the substrate surface (as shown in FIG. 4), along the centre lines separating each anode body. The sawing is carried out to a depth at which both stray manganizing layer (etc.) and, with it, dielectric insulating oxide underlayer is removed. Hence bare tantalum of the substrate wafer is revealed. This fresh surface is "re-formed" with dielectric layer, in order to provide a protective insulating layer thereon. The re-forming process is carried out as described above for the original dielectric layer.

Figure 5:
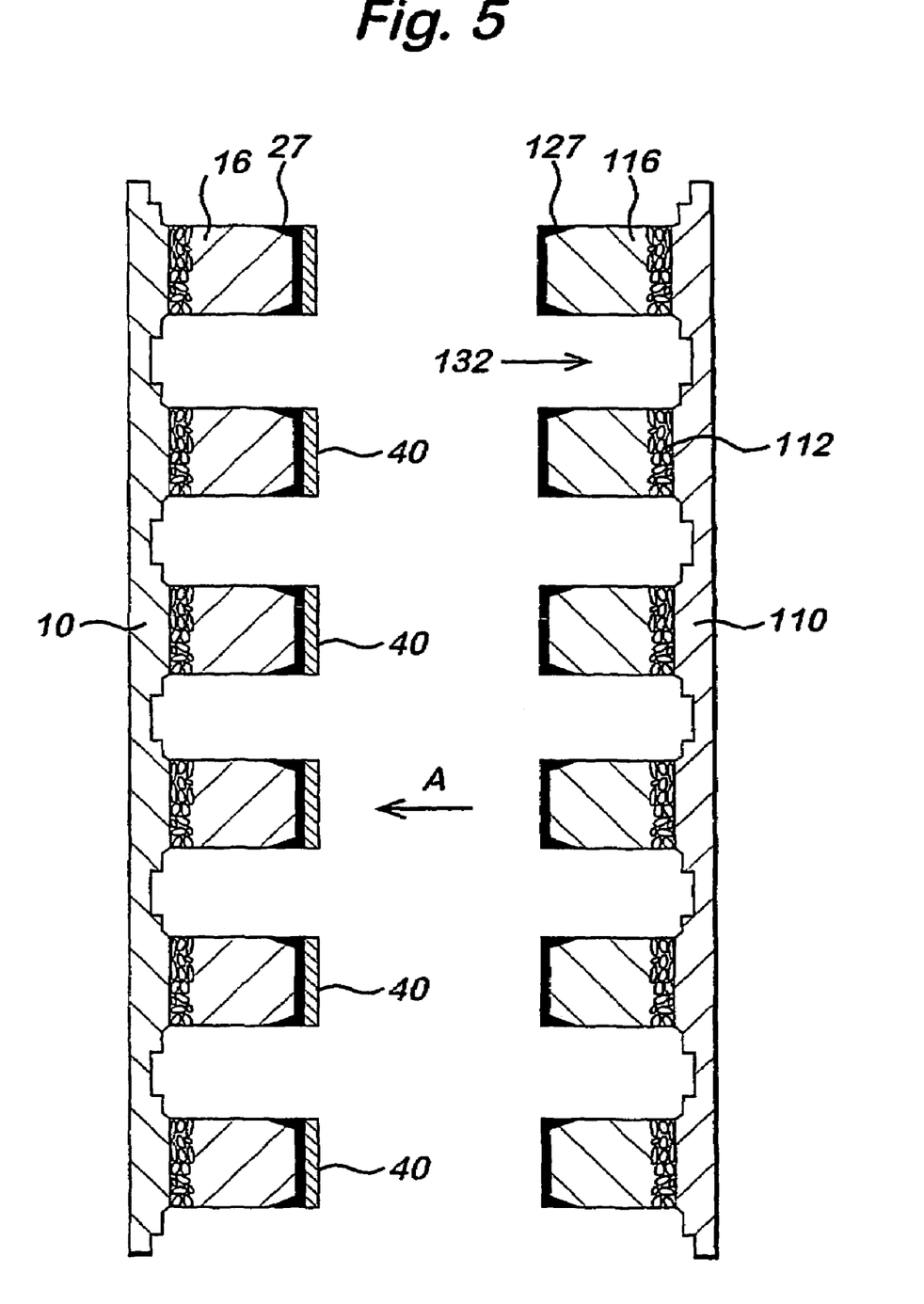
FIG. 5 is a sectional view through two substrates being processed according to a first embodiment of the present invention.

In parallel with the foregoing procedure, a second, identical substrate 110 is built up as above. This substrate is shown in FIG. 5, with numbering as for wafer 10, save for the addition of 100 (i.e. numbering for the second wafer=n+100).

Having reached this stage, there are now described hereafter two alternative embodiments of processes of the invention by which capacitor components may be made.

FIRST EMBODIMENT

Figure 6:
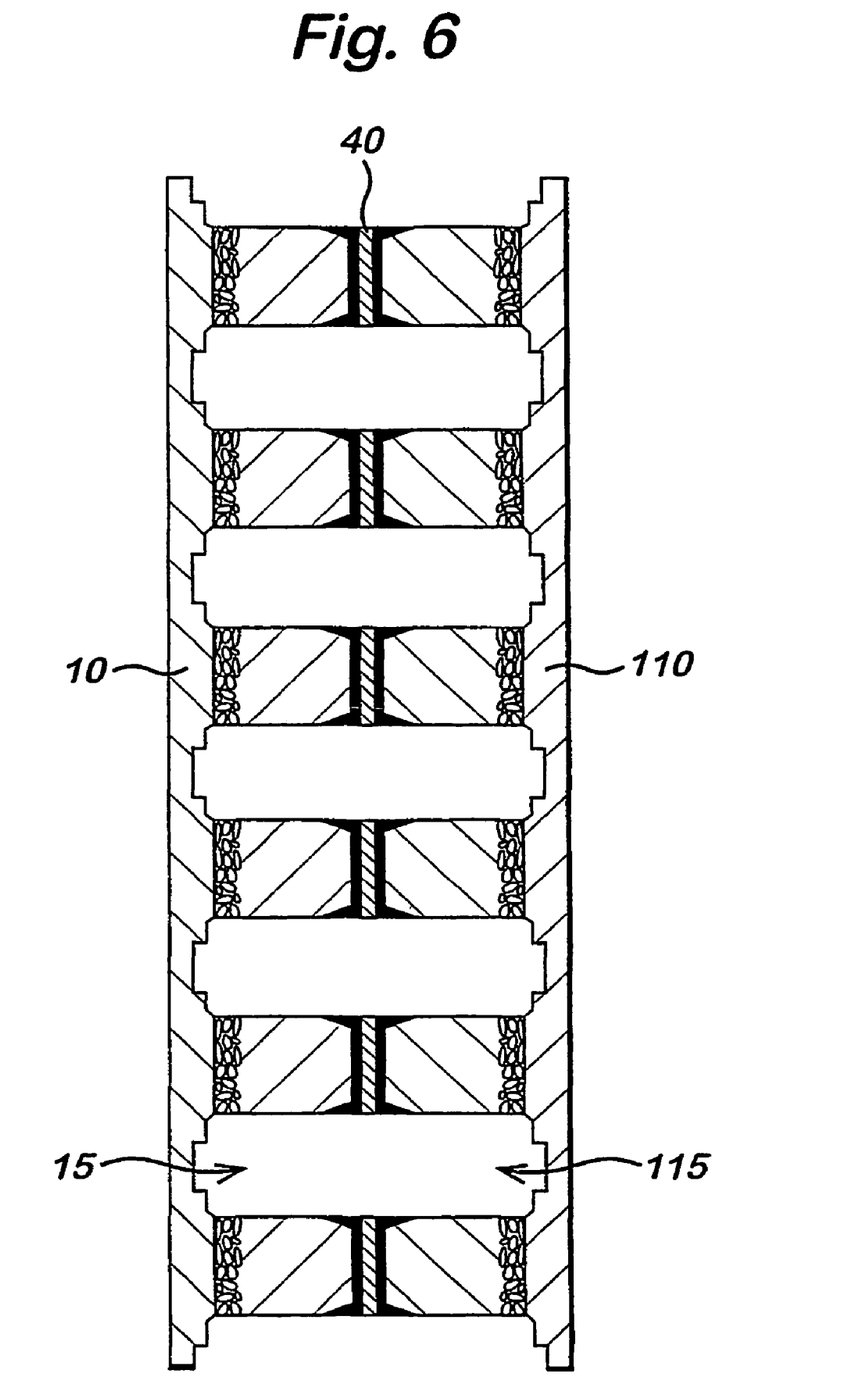
FIG. 6 is a sectional view through substrates processed according to the first embodiment.

The second substrate 110 is then aligned over the first substrate as a mirror image with bodies 16,116 facing one another. An adhesive layer 40 of silver paste is applied to top faces of each body of on the first substrate 10. The two facing upper surfaces of each respective body 16,116 are brought together (as indicated by arrow A in FIG. 5). FIG. 6 shows the two substrates in contact. The adhesive layer 40 forms an interface which provides electrical contact between the respective first and second body pairs 16,116. The adhesive is allowed to set under a compressive pressure and temperature, in order to ensure a good bond and complete curing of the adhesive.

Figure 7:
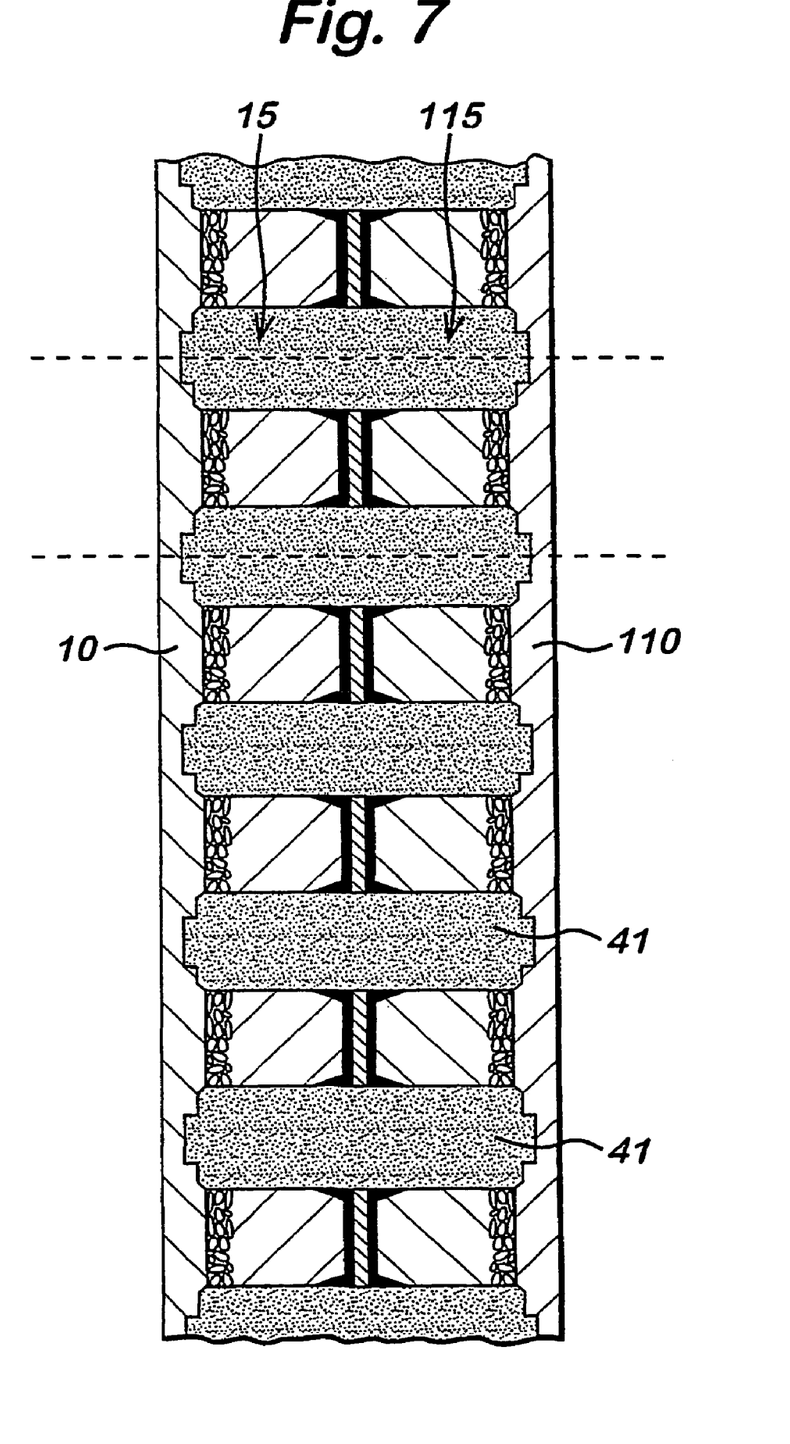
FIG. 7 is a sectional view through a substrate sandwich processed according to the first embodiment.

An encapsulation process is then carried out. Epoxy resin solution 41 (in FIG. 7) is infiltrated into the channels 15,115,14 formed between body pairs. The resin is forced in under pressure in order to take up all available space. The resin is allowed to harden to form a tough, electrically insulating encapsulation of body pairs 16,116.

Figure 8:
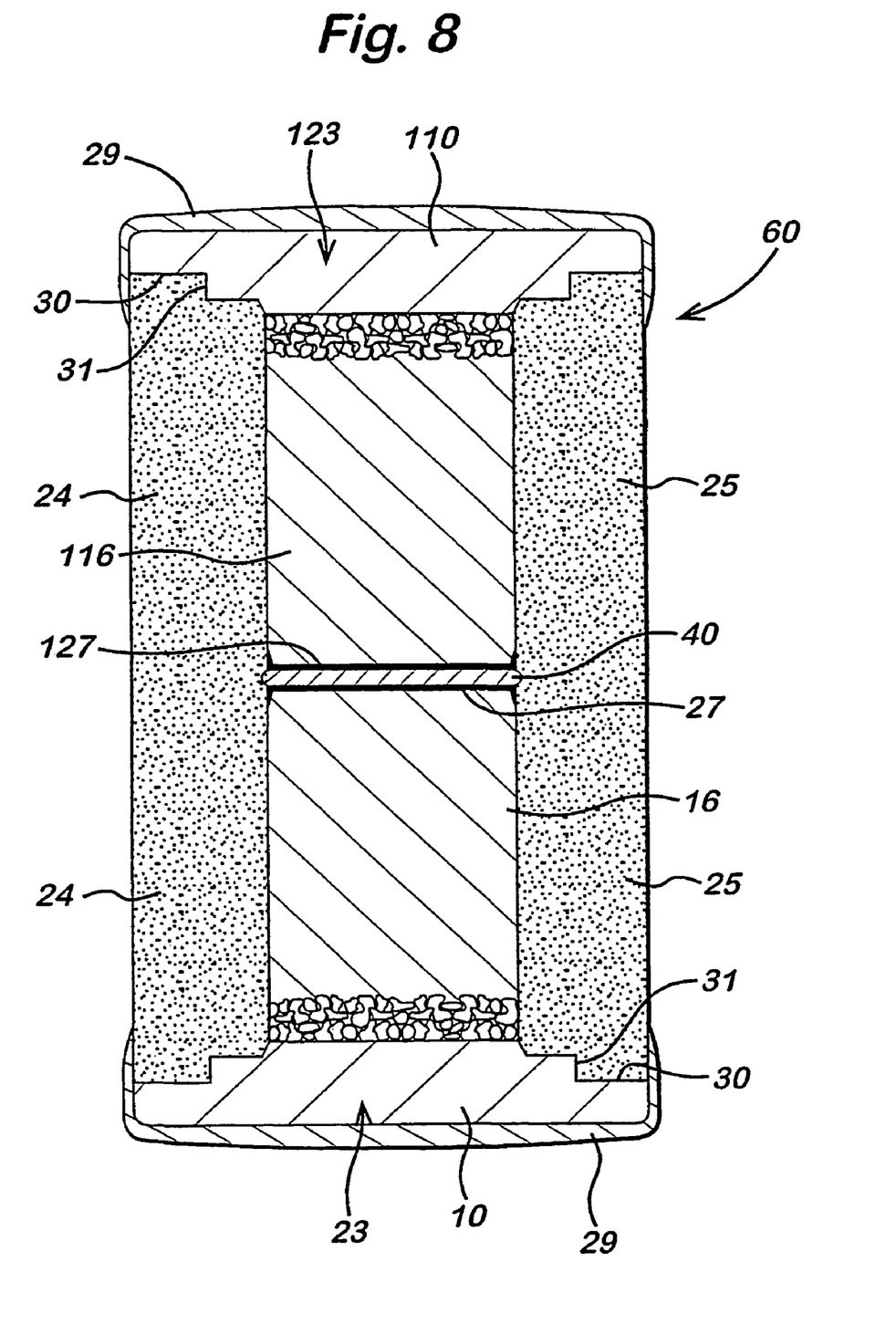
FIG. 8 is a sectional view through an individual capacitor pair component made according to the first embodiment.

A machining process is then conducted to separate the substrate sandwich 10,110 into individual components. The machining comprises use of a fine saw to machine in an orthogonal pattern through the centre line of channels 14,15, 115 as indicated by the dashed lines in FIG. 7. The substrate is thereby divided into individual rectilinear components, each comprising a capacitor pair 60 as shown in FIG. 8.

Each capacitor pair consists of two anode terminal portions 23,123 consisting of the substrate material 10,110. Sintered to each of the substrates is a respective capacitor body 16,116. The bodies are sheathed in epoxy resin sidewalls 24,25. The step 30,31 in the substrate corresponds to the machine isolation channels 32,132 formed in the original substrate wafer. This step is free of manganized coating and any other contaminant, and therefore ensures that the exposed anode terminal is isolated from the cathode terminal. The top end region of each capacitor body is coated in a layer of carbon paste (not shown), a layer of silver paste 21,121 and a further layer of silver paste 40 which forms a cathode portion of the component. As the cathode portion is sheathed in resin encapsulation material, there is no cathode terminal, the component representing a capacitor series pair having two anode terminals.

A final processing stage is a five-sided termination process. This is a well known process in the electronics industry which involves the formation of end caps 28,29 which form the external terminals of the capacitor. The termination layer metal may consist of discrete layers of silver, nickel and tin (preferably in that order). These are suitable metals for forming electrical connections by soldering of the capacitor terminals to contacts or other components of an electrical or electronic circuit.

SECOND EMBODIMENT

Figure 9:
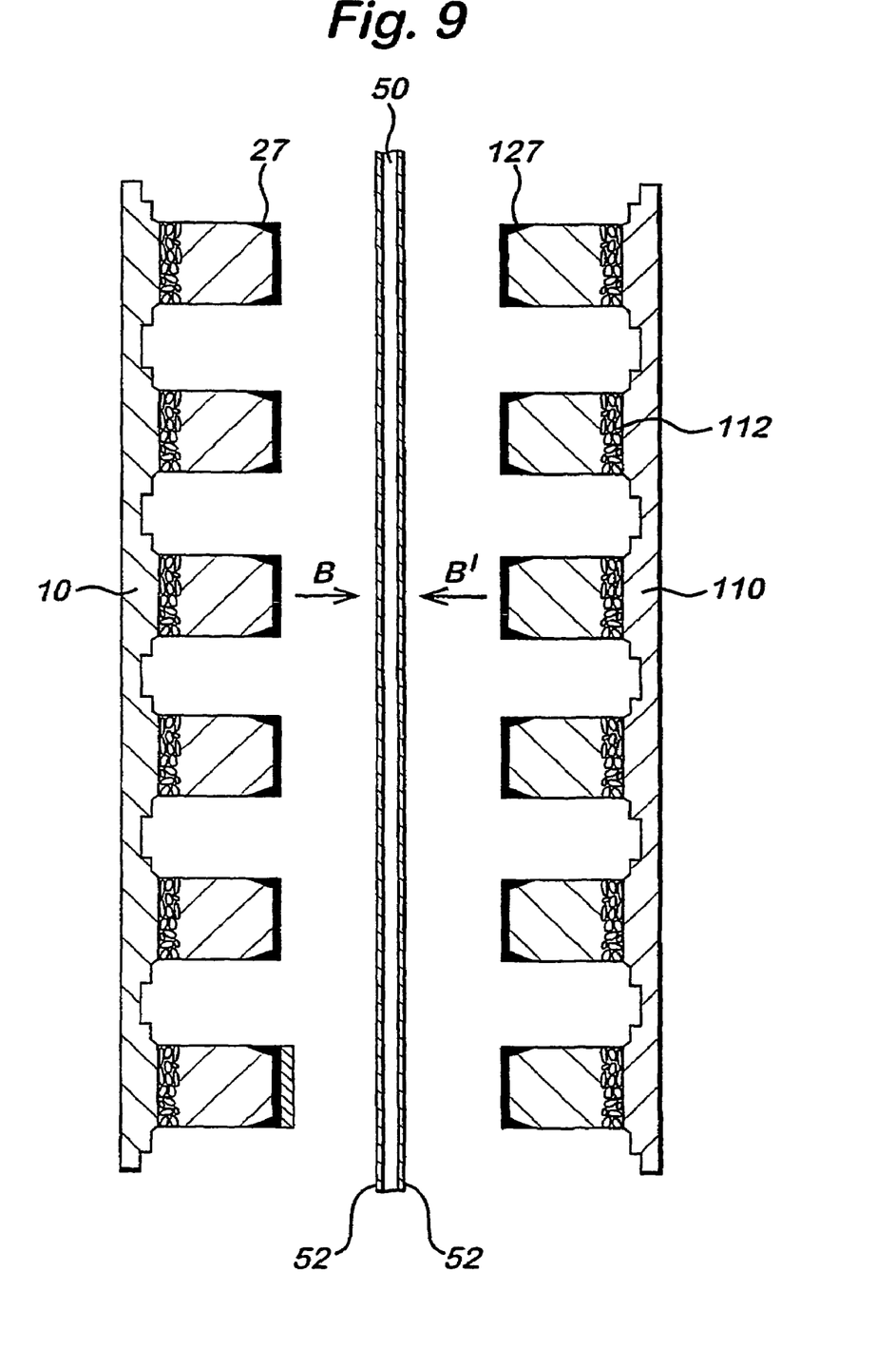
FIG. 9 is a sectional view through two substrates being processed according to a second embodiment of the present invention.

A second process according to the present invention proceeds as described in the foregoing with respect to FIG. 1 to 4. A tantalum plate 50 is provided, coated on each side thereof with a silver adhesive paste 52 (see FIG. 9). The processes substrates 10,110 (as previously described) are brought together either side of the plate 40, as indicated by arrows B and B'. On contacting (see FIG. 10) of the carbon coated end faces 27,127 of the bodies 16,116 with the adhesive paste 52, an electrical contact is formed. The silver adhesive is set under pressure and temperature to form a good electrically conductive bond. The plate 50 is thereby sandwiched between the two processed substrates 10,110.

Figure 10:
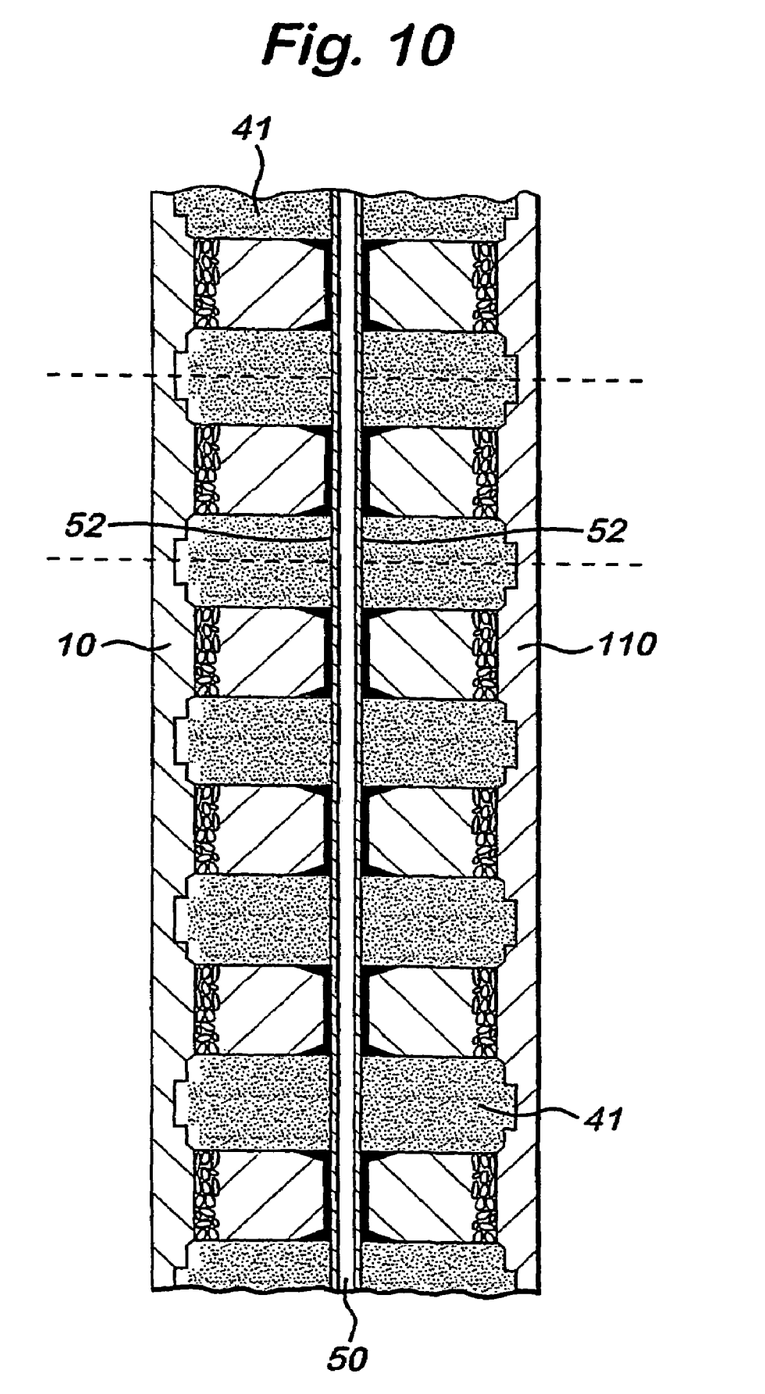
FIG. 10 is a sectional view through a substrate sandwich produced according to a second embodiment of the invention.

An encapsulation process is carried out, as for embodiment 1, save that two separate infiltrations of resin 41 are required, corresponding to the area between the bodies 16 on the one hand and bodies 116 on the other.

After hardening of the encapsulation resin, the substrate sandwich is then separated into individual component capacitor pairs by machining as with the first embodiment, along channels 14,15,115 etc, indicted by the dashed lines in FIG. 10.

Figure 11:
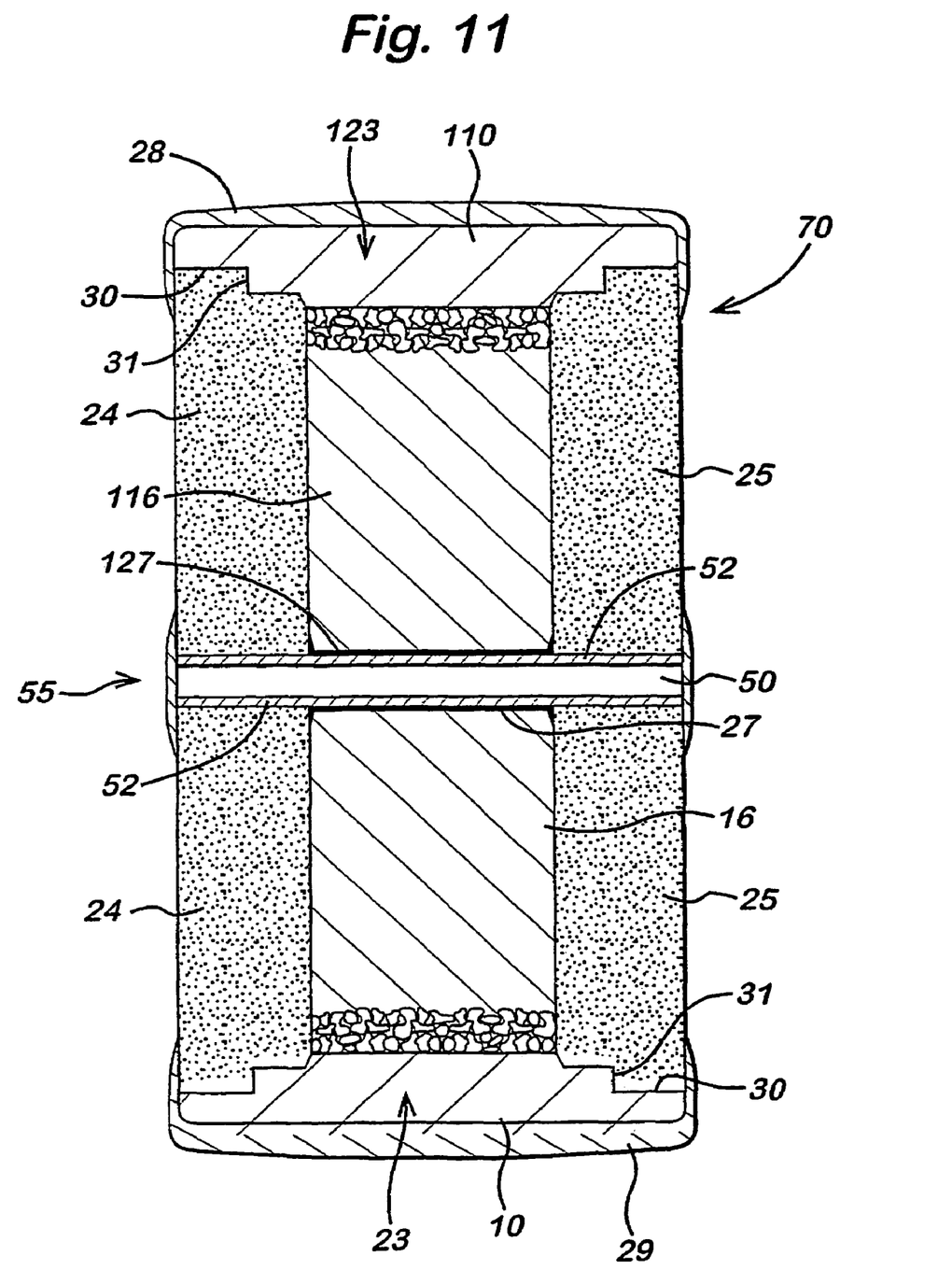
FIG. 11 is a sectional view through a capacitor pair component produced according to the second embodiment of the invention.

The component formed 70 is shown in FIG. 11. Each capacitor component consists of two anode terminal portions 23,123 consisting of the substrate material 10,110. Sintered to each of the substrates is a respective capacitor body 16,116. The bodies are sheathed in epoxy resin sidewalls 24,25. The step 30,31 in the substrate corresponds to the machine isolation channels 32,132 formed in the original substrate wafer. This step is free of manganized coating and any other contaminant, and therefore ensures that the exposed anode terminal is isolated from the cathode terminal. The end face region of each capacitor body is coated in a layer of carbon paste (not shown) and a layer of silver paste 27,127. A further layer of silver paste 52 is juxtaposed a metal plate section 50, which forms a cathode portion of the component. The plate may be any conductive material which is capable of being bonded and plated, for example steel or copper.

Next the anode terminal portions are subject to a five-sided termination process. This is a well known process in the electronics industry which involves the formation of end caps 28,29 (coating five exposed sides of the anode terminal portions) which form the external terminals of the capacitor. Similarly a four-sided termination process is conducted around the cathode region to form a cathode terminal band 55 covering the four sidewalls of the component, and in electrical contact with the plate 50 and adhesive 52.

The termination layer metal preferably consists of discrete layers of silver, nickel and tin (preferably in that order). These are suitable metals for forming electrical connections by soldering of the capacitor terminals to contacts or other components of an electrical or electronic circuit.

Figure 12:
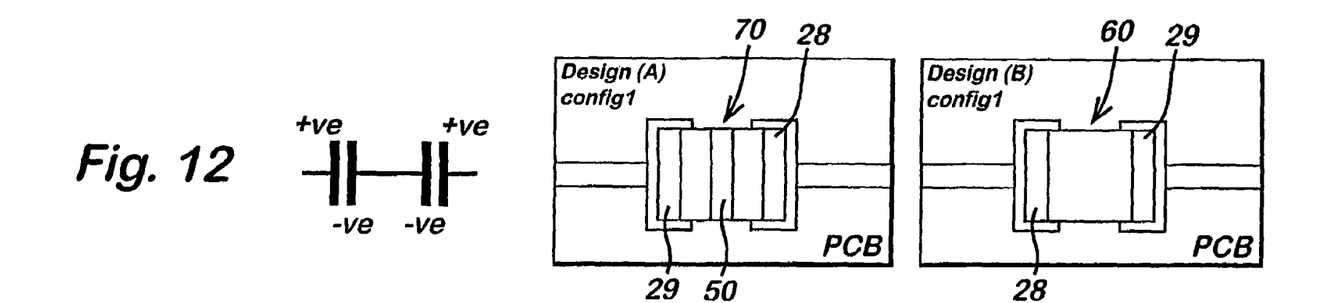
FIG. 12 is a plan view of components according to the first and second embodiments integrated into a circuit as series pairs. Also shown is a schematic circuit diagram representation of the series pair.
Figure 13:
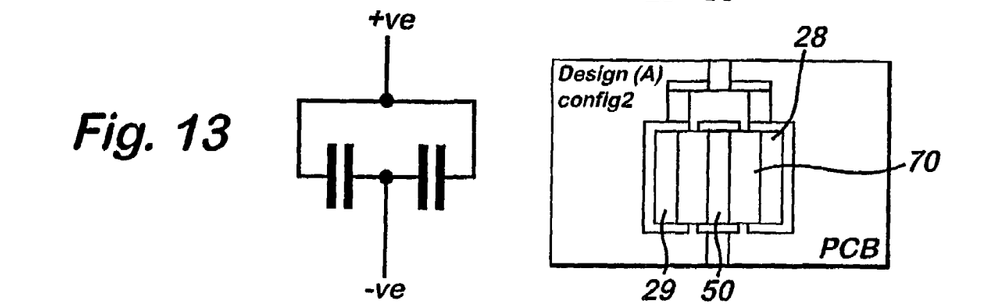
FIG. 13 is a plan view of a component according to the second embodiment of the invention, integrated into a circuit as a parallel pair. Also shown is a schematic circuit diagram representation of the parallel pair.
Figure 14:
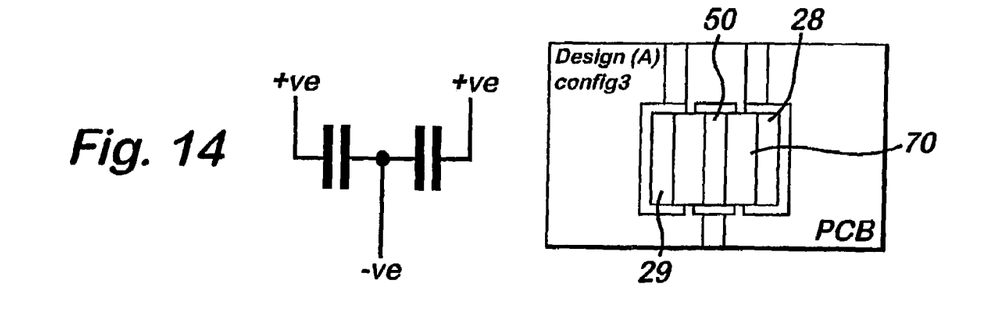
FIG. 14 is a plan view of a component according to the second embodiment of the invention, integrated into a circuit as an array pair. Also shown is a schematic circuit diagram representation of the array pair.

The component produced therefore has two anode end terminals and a central cathode terminal. This may be integrated with an electrical circuit in a variety of ways, as shown in FIGS. 12, 13 and 14. Particular examples are the series pair of FIG. 12 in which the cathode terminal is unconnected; the parallel pair of FIG. 13 in which both anodes are connected to a single circuit line and the cathode terminal to another; and the array pair of FIG. 14, in which the two anode terminals are each connected to respective circuit lines, and the cathode terminal to a third circuit line.

The present invention provides a method of manufacturing multiple capacitor pair components, each of which has high volumetric efficiency compared to two individual capacitors, and requiring less PCB footprint than two individual components. The method produces capacitors which are "non-polar" in the sense that they are incapable of being misoriented; the end poles always have one polar value (in the embodiments above, positive), and the central pole another polar value (negative). Hence the capacitors are easier to mount, as it is not necessary to determine a specific orientation before connecting the component to a PCB.

The invention claimed is:

1. A method of manufacturing multiple solid state electronic components comprising:
  (i) providing a first substrate provided with a plurality of first solid state electronic component elements formed on a surface thereof,
  (ii) providing a second substrate provided with a plurality of second solid state electronic component elements formed on a surface thereof,
  (iii) aligning the first and second substrates so that respective first and second component elements are each mutually aligned,
  (iv) fixing the first and second substrates together, so that the first and second elements are operatively connected one to another, thereby to form a substrate sandwich, and (v) dividing the substrate sandwich to form a plurality of individual components, each comprising a first component element operatively connected to a second component element.

2. A method as claimed in claim 1 wherein the first component elements and the second component elements have the same electronic function.

3. A method as claimed in claim 2 wherein the respective elements have differing performance characteristics as between first elements on the one hand and second on the other.

4. A method as claimed in claim 1 wherein the first and second component elements respectively have different electronic functions.

5. A method of manufacturing multiple solid state capacitive components comprising:
   a) providing a first substrate layer;
   b) forming on one surface of the first substrate layer a plurality of first upstanding bodies consisting of porous sintered valve-action material;
   c) providing a second substrate layer;
   d) forming on one surface of the second substrate layer a plurality of second upstanding bodies consisting of porous sintered valve-action material;
   e) forming an insulating layer on and extending through the porosity of the first and second bodies;
   f) forming a conducting cathode layer on the insulating layer;
   g) aligning the first and second substrates so that the bodies are mutually aligned;
   h) fixing the first and second substrates together to form a substrate sandwich in which first and second bodies are operatively connected,
   i) encapsulating the porous bodies in electrically insulating material and
   j) dividing the substrate sandwich into a plurality of individual capacitive components, each comprising two capacitors, the first corresponding to the first porous body and the second corresponding to the second porous body.

6. A method as claimed in claim 5 wherein at step g) the substrates are aligned face to face so that their respective first and second upstanding bodies face each other and step h) comprises electrically connecting aligned free ends of the upstanding bodies to form a sandwich configuration in which the first and second substrate layers are outer layers, whereby on division of the substrate sandwich, there is formed a plurality of component pairs, each having first and second anodic terminals corresponding to the outer first and second substrates, and a cathodic region corresponding to the electrical connection between the free ends of the bodies.

7. A method as claimed in claim 5 wherein at step g) the substrates are aligned back to back so that their respective first and second upstanding bodies face away from each other and step h) comprises electrically connecting back faces of the substrates to form a sandwich configuration in which the first and second substrate layers are inner layers, and the porous bodies are outer layers, whereby on division of the substrate sandwich, there is formed a plurality of component pairs, each having an anodic terminal region corresponding to the inner first and second connected substrates, and first and second cathodic terminal regions corresponding to respective first and second end regions of the component.

8. A method as claimed in claim 6 wherein at step g) a plate of conducting material is interposed between the respective free-ends of the first and second bodies so that the electrical connection is made via the plate material.

9. A method as claimed in claim 8 wherein the dividing at step h) also divides the plate material, and an exposed surface portion of the plate material formed in each component by the dividing provides a cathode terminal for each component.

10. A method as claimed in claim 6 wherein the electrical connection at step g) is made by means of discrete conducting adhesive pads applied between the free ends of the first and second upstanding bodies.

11. A method as claimed in claim 10 wherein the encapsulation process at step h) also encapsulates the electrical connection region, thereby obscuring the cathodic region in each component and permitting the formation of a component without a cathodic terminal.

* * * * *